United States Patent
Spiesman

[11] 4,146,750
[45] Mar. 27, 1979

[54] ANALOG MULTIPLEXER CONTROL CIRCUIT

[75] Inventor: Robert L. Spiesman, Phoenix, Ariz.

[73] Assignee: Honeywell Inc., Minneapolis, Minn.

[21] Appl. No.: 865,383

[22] Filed: Dec. 29, 1977

[51] Int. Cl.$^2$ ............................ G08C 15/06; H04J 3/04
[52] U.S. Cl. ............................... 179/15 A; 179/15 BL; 340/183
[58] Field of Search ......................... 179/15 A, 15 BL; 340/183, 347 DD

[56] References Cited

U.S. PATENT DOCUMENTS

| | | | |
|---|---|---|---|
| 3,793,636 | 2/1974 | Clark et al. | 340/183 |
| 3,818,143 | 6/1974 | Vrba et al. | 179/15 BL |
| 4,050,062 | 9/1977 | Crocker et al. | 179/15 A |

Primary Examiner—Thomas A. Robinson
Attorney, Agent, or Firm—Laurence J. Marhoefer; Lockwood D. Burton

[57] ABSTRACT

An improved multiplexer circuit features an addressing arrangement for effecting the selection, first, of the particular multiplexing module, then of an individual input from among the several inputs to the module. To this end, a latch assembly is provided for storing the address of the individual input to the module. Gating structure is provided, responsive to an address code for enabling the latch assembly to store the applied address code. An output switch is connected in the output circuit of the multiplexer module and operatively controlled by the selecting circuit to block any spurious output from the multiplexer module when the particular multiplexer is not selected.

6 Claims, 6 Drawing Figures

ANALOG MULTIPLEXER CONTROL CIRCUIT

BACKGROUND OF THE INVENTION

The present invention relates to computer control apparatus. More particularly, it relates to a multiplexer circuit for a process control computer system.

In the art of process control apparatus, the primary sensors are usually analog devices which respond to process variable conditions, such as pressure, temperature, flow, volume and the like, to produce an analog signal. The analog signal is then applied to the control system from which is derived a control signal to control the process at desired levels. In analog control systems, the input analog signals were, indeed, handled as analog signals by an analog controller. In some cases, by a time sharing technique, one analog controller could control several data points. In large instrumentation systems, such analog control becomes very expensive and complex. Digital control systems provide a means for handling a large number of control functions by a single digital computer. Such a system is shown in copending application of Woods et al, Ser. No. 773,913, filed Mar. 3, 1977.

In order for the digital computer to handle the signals from a great number of input sensors, first, multiplexing means are provided for selecting one at a time of the numerous input circuits for handling. Second, means are provided for selectively converting the analog signals from the sensors into equivalent digital signals for presentation to the digital computer.

SUMMARY OF THE INVENTION

It is, accordingly, an object of the present invention to provide an improved multiplexer circuit for process control system.

It is another object of the present invention to provide an improved multiplexer circuit with improved addressing means.

It is a further object of the present invention to provide an improved multiplexer circuit as set forth which enables the selection from among a great number of input circuits and prevents spurious operation during power-up and power-down intervals, all under programmatic control.

In accomplishing these and other objects, there has been provided, in accordance with the present invention, an improved multiplexer circuit which features an addressing means for effecting the selection, first, of the particular multiplexing module, then of an individual input from among the several inputs to the module. To this end, a latch assembly is provided for storing the address of the individual input to the module. Gating structure is provided, responsive to an address code for enabling the latch assembly to store the applied address code. An output switch is connected in the output circuit of the multiplexer module and operatively controlled by the selecting circuit to block any spurious output from the multiplexer module when the particular multiplexer is not selected.

BRIEF DESCRIPTION OF THE DRAWINGS

A better understanding of the present invention may be had from the following detailed description when read in the light of the accompanying drawings in which.

DESCRIPTION OF THE PREFERRED EMBODIMENT

Detailed Description

Figure 1:
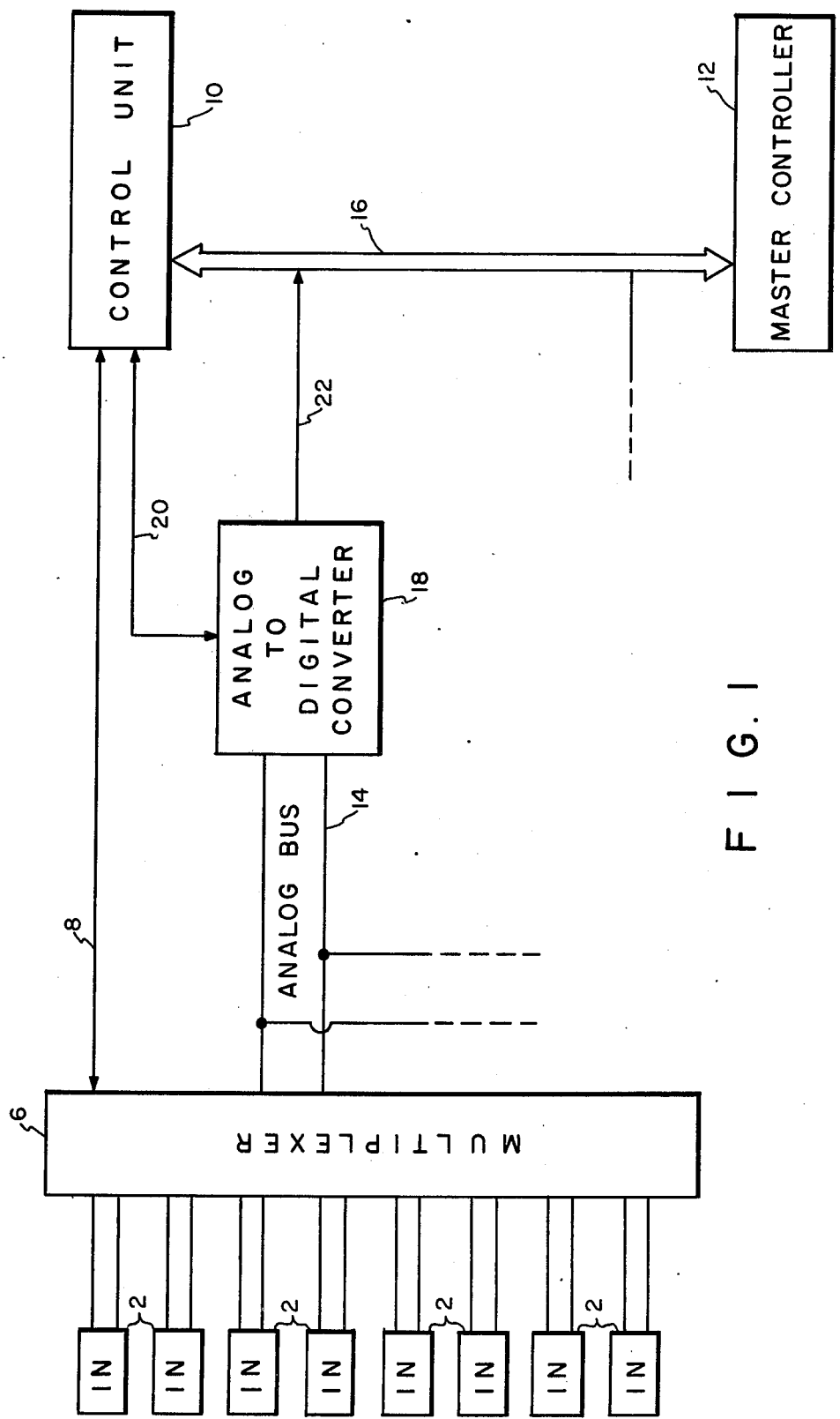
FIG. 1 is a block diagram of a computer based process control system embodying the present invention.

Referring now to the drawings in more detail, there is shown in FIG. 1 a data acquisition system such as is generally shown in the aforementioned copending Woods et al application, Ser. No. 773,913. In that application, a number of input/output (I/O) devices are connected to an analog process I/O board. That board is controlled by a process I/O controller which is, in turn, controlled by a master control unit. The master control unit includes a microprocessor.

In FIG. 1 there is shown a plurality of input circuits 2 from which are derived a corresponding plurality of input signals. Each of the input circuits 2 is connected by a pair of leads to the input terminals of a multiplexer 6. In the referenced copending application, the multiplexer is included in the analog process I/O board. The multiplexer operation is initiated and controlled by control signals applied thereto over a control bus connection 8 from a control unit 10. The control unit 10 may correspond to the process I/O controller of the referenced copending Woods et al application.

The multiplexer 6, under control of the control unit 10, effects a selection of one of the input circuits 2, as determined by instructions received from a master controller 12, for connection to the pair of output leads 14. As in the referenced copending application, the master controller 12 includes a microprocessor. The master controller 12 communicates with the control unit by way of a communication bus 16.

The output leads or analog bus 14 apply the multiplexer output signal to the input terminals of an analog-to-digital converter 18. The analog-to-digital (A/D) converter is controlled by signals received from the control unit 10 by the connecting leads or control bus 20. As will be seen, the A/D converter 18 also sends a control signal to the control unit 10. The output of the A/D converter is coupled by connecting means 22 into the communication bus 16 for transmission to the master control unit 12. Since the master controller 12 operates only on digital data, the analog input signals must be converted to digital data signals before transmission to the master controller 12 for processing. It should be noted that the master controller 12 may be the ultimate control central processor. On the other hand, the master controller 12 may be an intermediate control center responsive to ultimate control by a central processor unit, but having at the intermediate level a microprocessor with its own established control program, as in the aforementioned copending application Ser. No. 773,913.

In operation, the several analog input devices in the input circuits 2 are continuously monitoring the condition of the assigned process variable. The resulting signals are applied to the corresponding input terminals of the multiplexer 6. From the master controller 12 through the control unit 10, the multiplexer 6 is addressed to select a single one of the input signals for transmission to the analog bus 14. The signals on the analog bus 14 are applied as input signals to the input terminals of the A/D converter 18. The A/D converter 18, under the control of command signals from the master controller 12, converts the analog signal to a digital signal. The digital signal is applied on an output bus 22 to the communication bus 16 for use by the master controller 12.

In the exemplary embodiment as described in the copending Woods et al application, there are up to thirty-two process I/O boards, each including a multiplexer, and each accommodating up to eight individual process data input circuits. Thus, there is a facility of handling up to 256 input data points. As noted above, the control unit 10 may correspond to the process I/O controller of the copending Woods et al application. That control unit includes card files for the thirty-two process I/O boards with their multiplexer circuits. In the control system as set forth in the Woods et al application, the illustrated master controller 12 is but one of several such controllers associated in the total system. This structural relationship provides a background for a better understanding of the description of the detailed structure shown in FIGS. 2 and 3 following.

Figure 2:
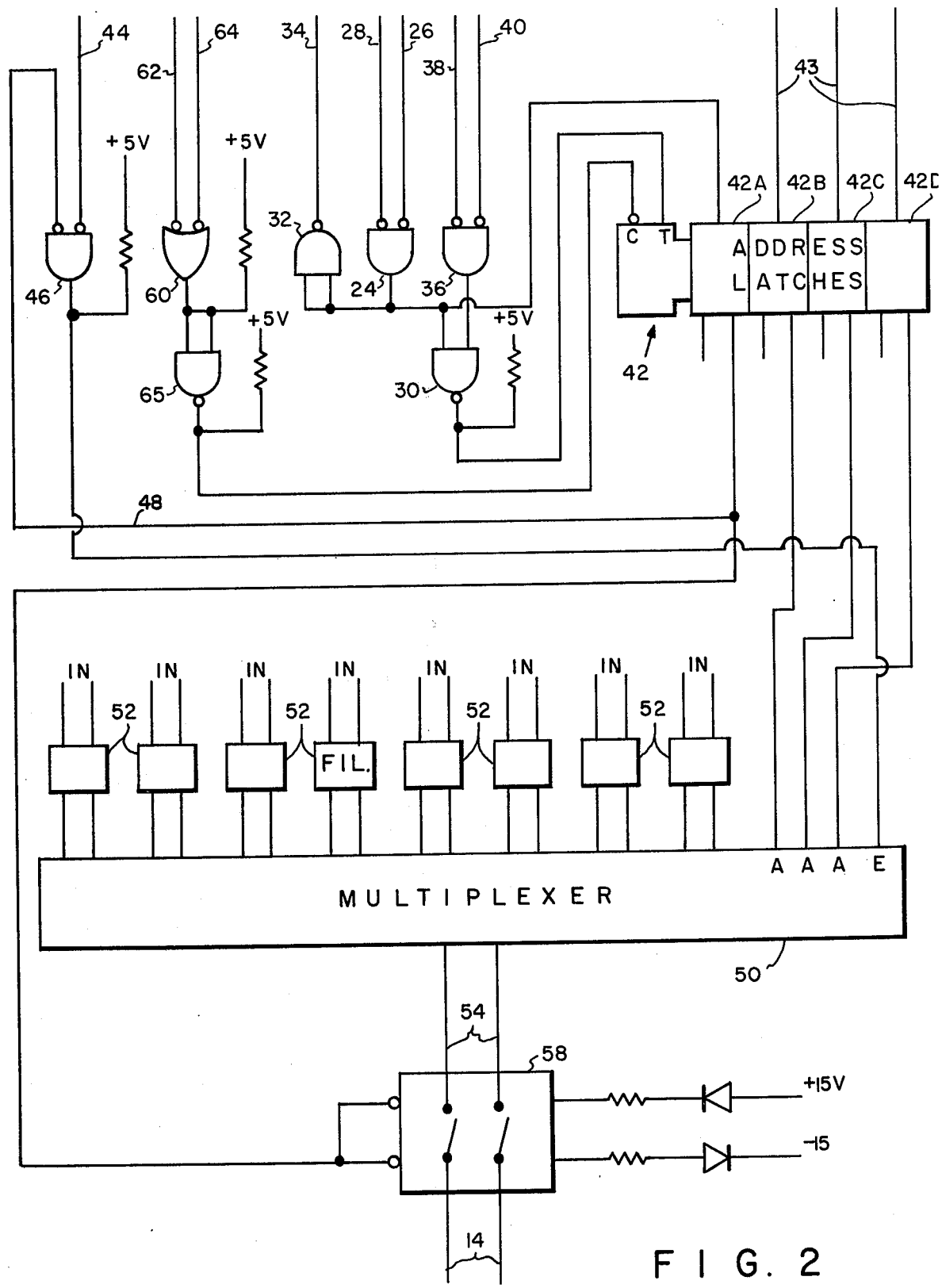
FIG. 2 is a logic block diagram of a multiplexer circuit embodying the present invention and which may be used in the multiplexer of FIG. 1.

In FIG. 2, there is shown a detailed block diagram of a multiplexer circuit such as may be used in the multiplexer circuit 6 of FIG. 1. An important feature of the multiplexer circuit is the means for controlling the operation of the multiplexer itself. The control unit card files, in the exemplary embodiment, are arranged as four card file assemblies with eight cards or process I/O boards in each card file assembly. A first NAND gate 24 receives a first address signal on a first one 26 of two input leads from the master controller 12 by way of the control unit 10. That first address signal is decoded by the control unit 10 and is indicative of which of the four card files is being addressed. A second address signal also from the master controller 12 by way of the control unit 10 is received at the other input lead 28. That signal, also decoded by the control unit 10, is indicative of which of the slots in the card file is being addressed; in other words, which of the process I/O boards is being selected. Together, these two signals effect a selection of one of the thirty-two analog process I/O boards. A selection of the particular board illustrated in FIG. 2 will be accomplished by the appearance of a logical "0" on both of the leads 26 and 28, which produces a logical "1" at the output of the gate 24. The output of the gate 24 is connected to one input terminal of a second NAND gate 30. The output of the gate 24 is also connected to both input terminals of a third NAND gate 32. Thus connected, the gate 32 serves as an inverter and returns a logical "0" signal on its output lead 34 to the master control 12 as an indication that the board address has been received and that the board is in place and operational.

A fourth NAND gate 36 has a pair of input leads 38 and 40. The lead 38 is connected to receive a signal from the master controller 12 indicative of the mode of the instruction, that is whether the operation to be performed is a "read" function or a "write" function which will appear on the lead 38 as a logical "0." The lead 40 is connected to receive a "strobe" signal from the master controller 12. A coincidence of the "strobe" signal on the lead 40 and the "write" instruction on the lead 38 produces a logical "1" signal at the output of the gate 36. That signal is applied as the other input signal to the gate 30, and together with the board address signal on the first input terminal of the gate 30 produces a logical "0" at the output thereof.

There is also provided a latch assembly 42. In the drawing, the latch assembly 42 is represented in block diagram form; in practice, it may be an integrated circuit chip of the type identified as an SN74LS175, manufactured by, among others, Texas Instruments Inc. Such a unit is, in effect, four flip-flops with common "clear" and "clock" controls, but with separate input and output circuits. The output of the gate 30 is applied as an input signal to the "clock," or "toggle," input T of the latch assembly 42. The output of the gate 24 is applied as input signal to the first stage 42a of the latch assembly 42. On the input leads 43 of the other three stages 42b, 42c and 42d, there is applied, respectively, a three-bit digital address code indicative of which one of the eight input circuits of the address board is to be selected. The three bit address code is applied to the input terminals of the three corresponding stages of the latch assembly 42. When the toggle signal is applied to the "clock" input T of the latch assembly from the output of the gate 30, that three-bit address code is clocked into the holding latches. At the same time, the board address signal from the gate 24 will be clocked into the first stage 42a of the latch assembly 42.

As will be seen later, herein, a signal is received from the A/D converter 18 and applied on a lead 44 to one input terminal of a NAND gate 46. The other input terminal of the gate 46 is connected by a lead 48 to the output of the first stage 42a of the holding latch assembly 42. Thus, when the latch assembly has been clocked, and a "board address" signal has been loaded into the first latch stage 42a, an output signal therefrom is applied to the associated input of the gate 46. When, then, the signal from the A/D converter is received on the lead 44, the gate produces an output signal which is applied as an "enable" signal to the "enable" input terminal E of a multiplexer device 50. The multiplexer device 50 is shown in a block diagram form; in the exemplary structure the multiplexer device 50 is a commercially available integrated circuit unit identified as a type MPC8D and sold by Burr-Brown.

The multiplexer chip 50 has, in addition to the "enable" input terminal, three "address" input terminals A to which the three output leads from the latch stages 42b, 42c and 42d are connected. Further, the multiplexer chip 50 has a plurality of pairs of input terminals to which the several input circuits 2 are connected, respectively. In the exemplary structure, there are eight pairs of such input terminals, accommodating the eight input circuits. In each of the input circuits 2, there is included an R.C. filter network 52 of conventional design. A feature of the multiplexer device 50 is that it includes a decoder to effect a 1-out-of-8 selection of the input terminal pairs for connection to a single pair of output terminals 54. A pair of leads connect those two output terminals 54 to a solid-state dual single-pole switch device 58. The switch device is schematically represented; in the exemplary embodiment, the switch is a commercially available unit known as type D 200 sold by Siliconix Incorporated. Although the two switch elements within the device are separately operable, in the present instance, they are connected to be simultaneously operable by a single control signal. That control signal is the output of the first stage 42a of the holding latch assembly 42. The output of the switch device 58 is connected as input signal to the A/D converter 18 by way of leads 14.

A NOR gate 60 has a first input terminal connected by a lead 62 connected to receive a "master clear" signal from the master controller 12. A second input terminal is arranged to receive a "multiplexer clear" signal by way of a lead 64 from the A/D converter 18, as will be shown in more detail, hereinafter. The output of the NOR gate 60 is inverted by an inverter 65 and applied as a control signal to the "clear" input c of the latch assembly 42. The "multiplexer clear" signal is generated by the A/D converter after the completion of a conversion. That signal applied to the "clear" input of the address latch assembly 42 resets all of the stages thereof, to make the latches ready for the next address. The resetting of the first latch 42a opens the switch elements of the switch device 58, thereby preventing any signal from being transmitted to the A/D converter 18. Similarly, if a "master clear" signal were transmitted from the master controller 12, that signal would override all others, reset the latches 42 and open the switches 58. That might occur if, for some reason, the master controller needed to abort a routine in progress.

Following the removal of the "master clear" or "multiplexer clear," the address signals on line 26 and 28 to provide a "board address" signal, together with the three-bit digital address code on the three leads 43 are presented to the input of the four stages respectively, of the latch assembly. When the "mode" signal and the "strobe" signal are received by the gate 36 and applied to the "toggle" or "clock" input T of the latch assembly 42, the several address signals are loaded into the respective latches. The switches 58 are closed and the three-bit address code is applied to the decoder input of the multiplexer unit 50. At the same time, the signals present at the input circuits 2 are applied through the appropriate filters 52 to the corresponding pairs of input terminals on the multiplexer unit 50. The decoder within the multiplexer unit 50 will effect a selection in accordance with the three-bit address code as to which of the eight input circuits will be connected, within the multiplexer unit 50, to the output terminals 54, thence, through the switch 58 to the analog bus 14. Then, upon the occurrence of the "enable" signal from the A/D converter 18 through the gate 46 applied to the "enable" input terminal E of the multiplexer unit 50, the connection of the selected input circuit to the analog bus 14 is effected.

Figures 3, 3C:
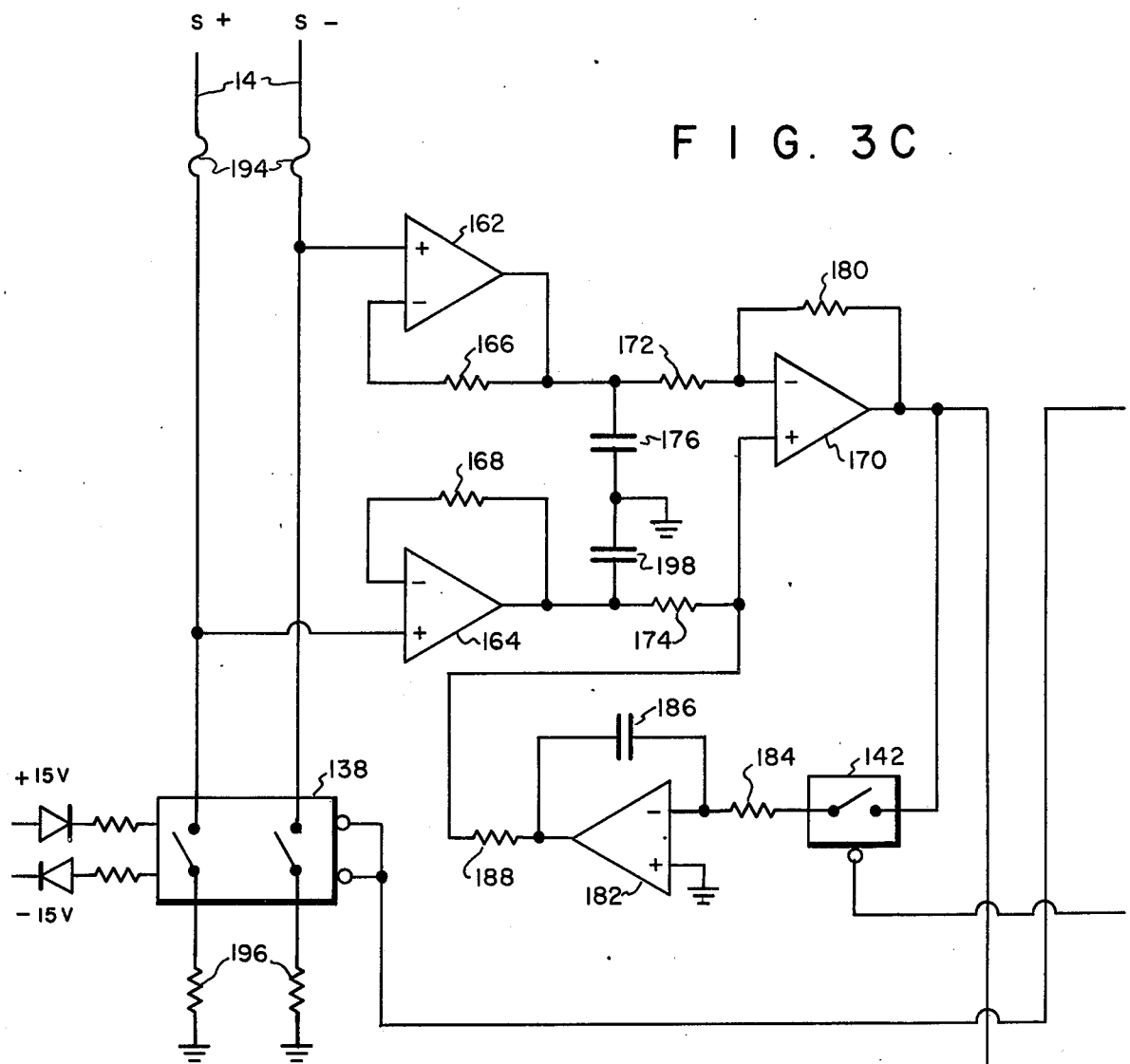
FIG. 3 is a block diagram showing the arrangement of FIGS. 3A, B and C which, in turn, is a logic block diagram of an analog-to-digital converter suitable for use in the system shown in FIG. 1.
Figure 3A:
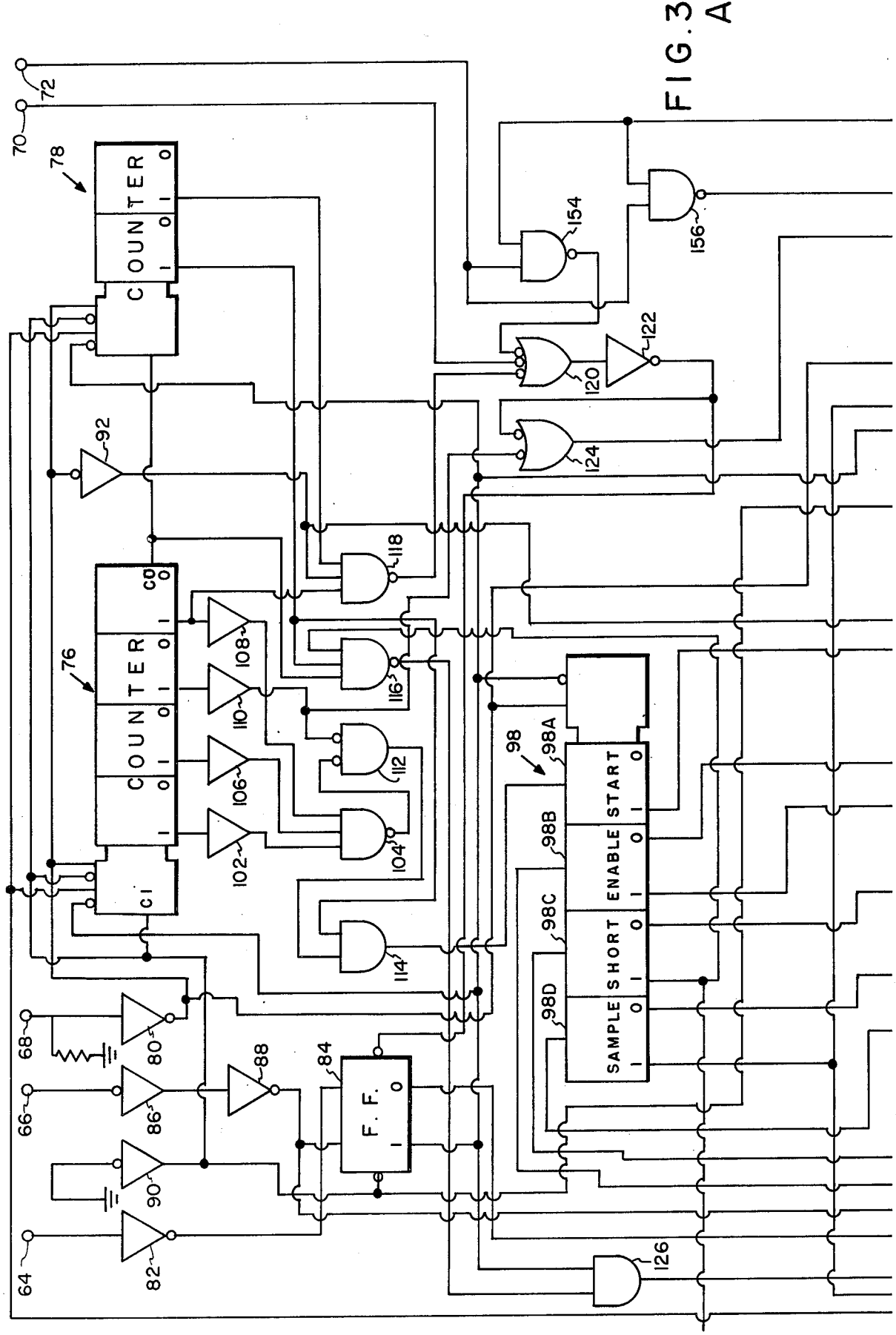
Figure 3B:
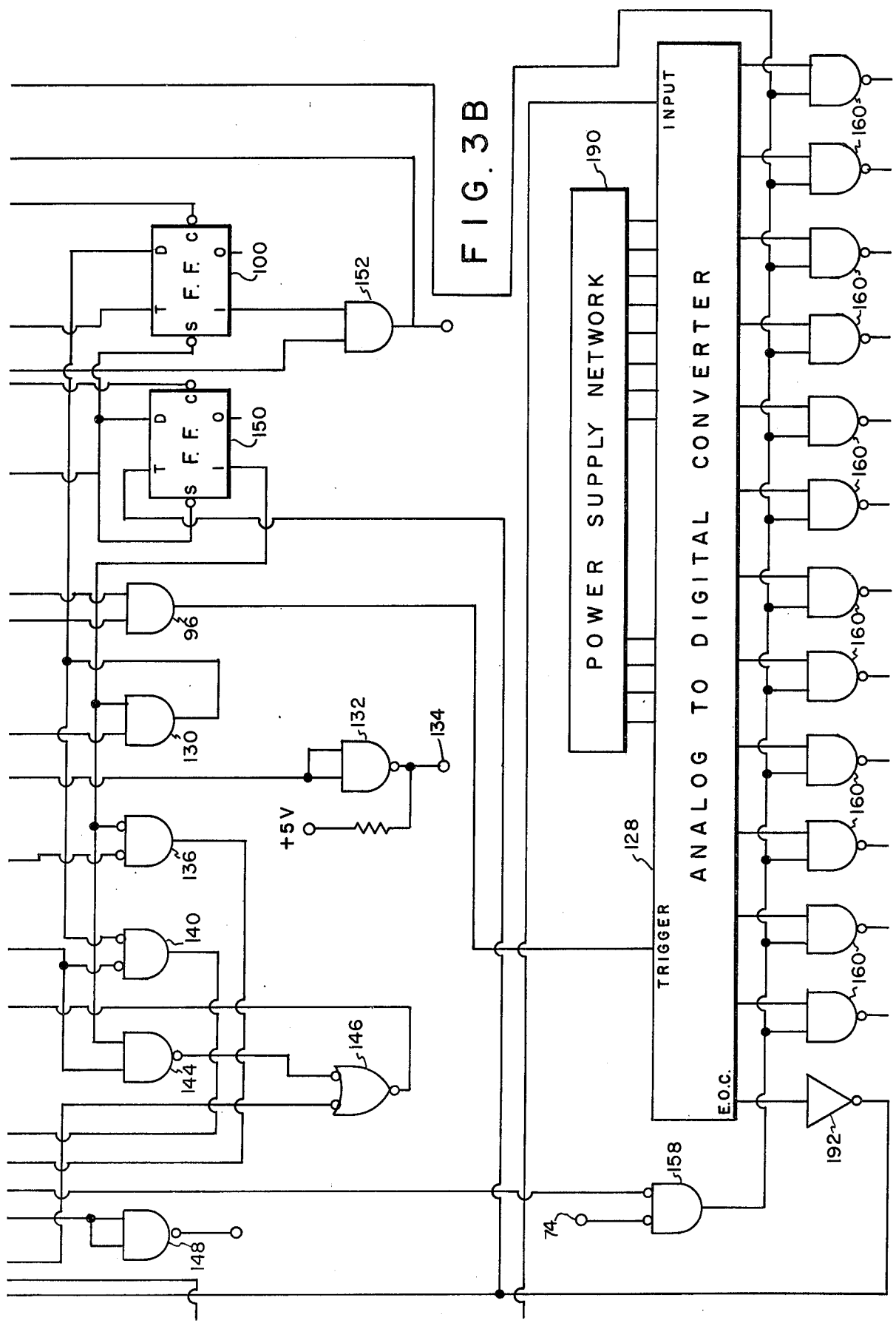

In FIGS. 3a, 3b and 3c, assembled in the manner shown in FIG. 3, there is shown schematically in logic block diagram form an analog-to-digital converter and control circuit such as may be used in the analog-to-digital circuit 18 of FIG. 1. As with the multiplexer circuit 6, the analog-to-digital circuit includes as a significant part thereof, control circuitry for controlling the operation of an actual A/D converter module, and for conditioning the input signal prior to conversion.

At the control input, the control leads, represented by the control bus 20 in FIG. 1, includes a lead 64 on which a board direction, or "Read/write," signal is supplied from the master controller 12 by way of the control unit 10. An "address" signal on a lead 66, also included in the bus 20, is supplied from the master controller 12 to indicate that the board receiving the signal has been addressed for operation. A third lead 68 in the bus 20 carries a "clock" signal from a free-running clock signal generator in the control unit 10. Two other control leads included in the control bus 20 are a "master clear" lead 70 and an "abort" lead 72. These latter two leads also carry signals from the master controller 12 to effect a control over the A/D converter circuit. A "Read" strobe pulse is supplied on a further lead 74 which is also a part of the bus 20.

In order to effect a proper control over the operation of the A/D converter, means are provided for producing a series of time sequence control signals. To this end, there is provided a counter arrangement formed of two cascaded counter units 76 and 78. These counters are shown in schematic diagram form. In the exemplary embodiment of the present invention, these counters are four-bit binary counters of a commercially available type SN74LS161 manufactured and sold by Texas Instruments Inc., among others. Although both of the counter units are, in fact, four-bit units, only two sections are illustrated in the counter unit 78 since only two of the sections are used in the exemplary embodiment. In effect, the counters are formed of a series of flip-flop units with common control logic. The "clock" signal received on the lead 68 is passed through an inverter 80 and applied to the "clock" input terminals of the two counters 76 and 78.

The "Read/write" signal received on the lead 64 is passed through an inverter 82 and applied as an input signal to a flip-flop 84 about which more will be said later. The "address" signal received on the lead 66 is, for buffering purpose, passed through two cascaded inverters 86 and 88, to the "clock" input terminal of the flip-flop 84. An inverter 90 has a grounded input, the output of which is connected to provide a bias signal for the counters 76 and 78. The inverted "clock" signal from the output of inverter 80 is also applied through an inverter 92 to one input of a NAND gate 118 and to an AND gate 96. The inverted clock signal from the inverter 80 is applied directly to the clock input terminal of a latch assembly 98 and of a flip-flop 100.

The counter assembly, as mentioned hereinbefore is formed of the four stages of a first four-bit counter 76 and the first two stages of a second four-bit counter 78. Each of the two counters have common control logic. The output of the first stage of the counter 76 is applied through an inverter 102 to one input terminal of a three input NAND gate 104. A second input of the NAND gate 104 is connected through an inverter 106 to the output of the second stage of the counter 76. Similarly, the third input of the NAND gate 104 is connected, through an inverter 108 to the output of the fourth stage of the counter 76. The output of the third stage of the counter 76 is connected, through an inverter 110, to one input terminal of a NAND gate 112. The other input of the NAND gate 112 is connected to the output of the NAND gate 104. The output of the gate 112 is connected to one input terminal of an AND gate 114. The other input terminal of the AND gate 114 is connected to the output of the fifth stage of the counter (the first stage of the second counter unit 78). The output of the fifth stage of the counter is also connected to one input of a NAND gate 116 the second input terminal of which is connected to the "carry" output of the fourth stage of the counter 76. A NAND gate 118 has one input terminal connected directly to the output of the fourth stage of the counter 76. A second input of the gate 118 is connected to the output of the inverter 92 while the third input to the gate 118 is connected directly to the output of the sixth counter stage (the second stage of the counter 78).

The output of the gate 118 is connected through one input terminal of a NOR gate 120, through an inverter 122, and one input terminal of a NOR gate 124, to the "clear" input of the flip-flop 100. The output of the inverter 122 is also applied to the "clear" input of the flip-flop 84. A second input terminal of the NOR gate 124 is connected to the output of the inverter 110. The output of the gate 116 is applied as one input signal to an AND gate 126. The output of the gate 114 is applied as input signal to the first latch 98A of the latch assembly 98.

The latch assembly 98 may be of the same type as the latch assembly 42 of FIG. 2. Again, the latch assembly 98 includes four individual flip-flops with common control logic. The first latch 98A controls a "start" signal at its output terminal which is connected to a second input of the AND gate 96. The output of the gate 96 is connected to the "trigger" input of an analog-to-digital converter module 128. The A/D module 128, in the exemplary embodiment, is a commercially available unit of the type identified as ADC80 sold by Burr-Brown. The second latch 98B of the latch assembly has its "reset"0 output connected to one input terminal of an AND gate 130. The "set" output of the latch 98B is connected through an inverter 132 to an output terminal 134. The terminal 134 is connected through one of the leads of the control bus 20 to the control bus 20 to the control unit 10, thence by way of one of the leads of the bus 8 to the "enable" input lead 44 of the multiplex circuit shown in FIG. 2. The "reset" output of the third latch 98c is connected to one input terminal of a NAND gate 136. The "set" output of the latch 98c is connected to the control input of a switch assembly 138. The "reset" output of the fourth latch 98d is connected to one input of a NAND gate 140. The "set" output of the latch 98d is connected to the control input of a switch 142. The "reset" output of the latch 98d is also connected to one input of a NAND gate 144. The output of the gate 130 is connected to the second input of the gate 140 and to the control input of the flip-flop 100. The output of the gate 136 is connected to the input of the latch 98b while the output of the gate 140 is connected to the input of the latch 98c. The output of the gate 144 is connected to one input terminal of an AND gate 146, the other input of which is connected to the output of the gate 126. The output of the gate 146 is connected to the input of the latch 98d.

The "reset" output of the flip-flop 84 is connected through an inverter 148, the output of which is connected through the control bus 20 to the master controller 12. The "set" output of the flip-flop 84 is connected to one of the control input terminals each of the counter units 76 and 78, to a control input of the latch assembly 98, to the "clear" input of a flip-flop 150, and to the second input terminal of the gate 126. The output of the inverter 90 is also connected to the "preset" input terminal of each of the flip-flops 100 and 150 as well as a control input of the flip-flop 150. The output of the flip-flop 150 is connected to the second input terminals of each of the gates 130, 136 and 144. The output of the flip-flop 100 is connected to one input of an AND gate 152, the output of which is connected to the input lead 64 of the multiplexer circuit of FIG. 2 through the bus 8. The second input of the gate 152 is connected to the "set" output of the latch 98D.

The two additional control leads forming a part of the control bus 20 are the lead 70 on which a "master clear" signal from the master controller 12 is received, and an "abort" signal on the lead 72. The lead 70 is connected to one of the input terminals of the NOR gate 120. The lead 72 is connected to one input of a NAND gate 154 and to one input of a NAND gate 156. The output of the gate 154 is connected to a third input of the NOR gate 120. The output of the gate 156 is also connected to the input lead 64 of the multiplexer circuit. The lead 74 and the output of the inverter 88 are, respectively, connected to the two input leads of a NAND gate 158 the output of which is connected to enable all twelve of the output gates 160 of the A/D converter 128 as well as to enable the gates 154 and 156.

Data input signals are applied to the A/D converter circuit by way of the input leads 14 which are the output leads from the multiplexer circuit. The input leads are connected to a signal conditioning circuit which includes a first amplifier 162 having its non-inverting input connected to the negative one of the two leads 14, and a second amplifier 164 having its non-inverting input connected to the positive one of the two leads 14. The inverting input of the amplifier 162 is connected through a feedback resistor 166 to the out of the amplifier 162. Similarly, the inverting input of the amplifier 164 is connected through a feedback resistor 168 to the output of the amplifier 164. The output of the amplifier 162 is connected to the inverting input of an amplifier 170 through an input resistor 172. The noninverting input of the amplifier 170 is connected through an input resistor 174 to the output of the amplifier 164. The output of the amplifier 162 is connected through a series connection of a first and a second capacitor 176 and 178, respectively, to the output of the amplifier 164 with the junction between the two capacitors connected to ground. The output of the amplifier 170 is connected to the inverting input thereof through a feedback resistor 180. The output of the amplifier 170 is also connected through a resistor 181 to the analog input terminal of the A/D converter module 128. An amplifier 182 has its inverting input terminal connected through an input resistor 184 and the switch 142 to the output of the amplifier 170. The noninverting input of the amplifier 182 is connected to ground. The output of the amplifier 182 is connected through a holding capacitor 186 to the inverting input thereof. The output of the amplifier 182 is also connected through a coupling resistor 188 to the noninverting input of the amplifier 170.

A power supply network 190 is provided to supply the necessary energization for the A/D converter module 128. The A/D converter module 128 includes means for producing an output signal indicative that the conversion has been completed. That signal appears at an "end of conversion" output terminal and is applied through an inverter 192 to one of the control inputs of each of the counter modules 76 and 78 and to the clock input of the flip-flop 150.

In operation, the analog signals from the multiplexer circuit 6 are carried on the leads 14 through a pair of fuses 194 to the input of the signal conditioning portion of the analog-to-digital converter circuit. Initially the switches 138 are closed which connect the two leads 14 through a pair of small resisters 196 to ground. The closure of the switches 138 effectively short circuits the input leads to ground leaving substantially a zero input to the signal conditioning portion of the analog-to-digital converter circuit. Similarly the switch 142 is closed. With the switch 142 closed and substantially a zero input to the signal conditioning circuit, a signal will be applied to the input of the amplifier 182 which is only a function of the zero drift of the amplifier 170. With that signal applied to the input to the amplifier 182, the corresponding signal is stored across the capacitor 186 and applied to the non-inverting input of the amplifier 170. That arrangement provides an offset correction for the amplifier 170, offsetting any zero drift that may be present in the amplifier. When the switch 142 is open, the charge across the capacitor 186 maintains that offset correction signal for application to the amplifier 170 during its active state. The two buffer amplifiers 162 and 164 connected, respectively, to the two input leads 14 are interconnected in such a way, as hereinbefore set forth, as to accomplish a high order of common mode rejection.

At the beginning of operation, the counters 76 and 78 will have been cleared by the signal from the flip-flop 84 which is standing in its reset condition. The bias signal is applied from the inverter 90 to the "load" terminals of the counters 76 and 78 and to one of the two "enabling" terminals of the counter 76. That enabling terminal of the counter 78 is connected to the "carry output" terminal of the last stage of the counter 76. The other "enabling" terminals of the two counters 76 and 78 are connected to the output of the inverter 192 which changes state at the end of conversion of the A to D converter 128. The "clock" signals applied to the "toggle" input terminals of the two counters 76 and 78 from the inverter 80 are ineffective until the "clear" signal has been removed. When an address signal is received from the master controller 12 applied through the buffering inverters 86 and 88 to the "toggle" input of the flip-flop 84, and there is a signal applied thereto from the master controller 12 through the input terminal 64 and the inverter 82 to the data input of the flip-flop 84, the flip-flop 84 will change its output state to remove the "clear" signal from the counters 76 and 78. When the flip-flop 84 changes state, a signal is also applied to the input of the AND gate 126 which had been enabled by the output of the gate 116. The output of the gate 126 is applied through the gate 146 to the input of the "sample" latch 98d of the latch assembly 98. The change of state, or "setting," of the flip-flop 84 has also removed the "clear" signal from the control input of the latch assembly 98. With the occurrence of the next "clock" signal applied to the "toggle" input of the latch assembly 98, the signal on the input of the latch 98d "sets" that latch to produce an output signal which is applied to the control input of the "sample" switch 142 in the signal conditioning portion of the circuit shown in FIG. 3C. That signal causes the switch 142 to be opened removing the output signal of the amplifier 170 from the input of the amplifier 182 allowing the charge on on the capacitor 186 to maintain the outputs of the amplifier 182 as a correcting input to the amplifier 170.

The next "clock" pulse allows the latch 98c in the latch assembly 98 to be "set" by a signal applied thereto from the NAND gate 140 which had been conditioned by the setting of the latch 98d. Since the AND gate 130 had not been "made" due to a logical "low" applied to one input terminal thereof from the reset output of the latch 98b and from the set output of the end-of-conversion flip-flop 150. The setting of the latch 98c produces an output signal which is applied to the control input terminals of the switch assembly 138. That signal applied to the switch assembly 138 causes the two switch elements therein to be opened, removing the grounding short from the input leads 14. The "setting" of the latch 98c allows the NAND gate 136, which had been enabled by the logical "low" signal applied thereto from the end-of-conversion flip-flop 150, to be made. The output signal therefrom is applied to the input of the latch 98b which is then "set" by the next clock pulse. The set output of the latch 98b is applied through the inverter 132 to an output terminal 134 which is, in turn, connected to the input lead 44 of the gate 46 in the multiplexer, the output of which is applied to the enable input terminal of the multiplexer module 50. Since the multiplexer 50 had been preconditioned and addressed, ready for the "enable" signal, the application of that "enable" signal thereto causes the selected input signal to be applied to the output leads 14. Thus with the switches 38 and the switch 142 open, the application of the selected analog signal to the input of the amplifiers 162 and 164, thence to the amplifier 170, conditions the analog signal for application to the input terminal of the analog-to-digital converter module 128.

While the sequence has been stepping through the latches 98d, 98c and 98b, the counter 76 and 78 has been also stepping through the first three steps of the sequence, setting the first three stages of the counter. On the next "clock" pulse, the fourth stage of the counter 76 will have been set, "making" the gate 104 and, in turn, "making" the gate 112; the gate 112 had been enabled when the third stage of the counter 36 had been set. The output of the gate 112 is applied as an enabling signal for the gate 114. The other input terminal of the gate 114 is connected to the "set" output of the fifth stage of the counter (the first stage of module 78) and, on the setting of the fifth stage, the gate 114 will be "made", applying an input signal to the latch 98a of the latch assembly 98. The "set" output of the latch 98a is applied through the gate 96 to the "trigger" input of the analog-to-digital converter module 128. The gate 96 will have been "made" on the occurrence of the next "clock" signal applied thereto through the inverter 92. When the signal has been applied to the "trigger" input of the analog-to-digital converter module 128, that module first changes the status of its end-of-conversion signal applied to the input of the inverter 192. It then begins the conversion of the analog signal appearing at the input terminal thereof into a digital signal. The change of state of the signal applied to the inverter 192 is applied to the "enable" terminals of the counter units 76 and 78, stopping the counting operation thereof until the analog-to-digital converter has completed its conversion. When the converter module 128 has completed its conversion, the signal at the end-of-conversion terminal will again change states to restore the enabling signal on the counters 76 and 78. The change of state of the "end-of-conversion" signal applied through the inverter 192 is also applied to the "toggle" input of the end of conversion flip-flop 150, thereby causing that flip-flop 150 to set. The setting of the flip-flop 150 causes the gate 136 to open and, upon the next "clock" pluse, to reset the latch 98b. The setting of the flip-flop 150 also enabled the gate 130 which is "made" when the latch 98b is reset. The "making" of the gate 130 applies a signal to the data input of the flip-flop 100 which, on the next "clock" signal will set. The setting of the flip-flop 100 causes the gate 152, which had been enabled when the latch 98d was set, to be "made." The output of the gate 152 is applied to the input lead 54 of the multiplexer circuit of FIG. 2. That lead is connected through a gate 60 and an inverter 65 to the "clear" terminal of the address latch 42 of the multiplexer. That latch assembly is thereby cleared of the preceding address and made ready to receive a subsequent selected address.

The application of the "end-of-conversion" signal through the inverter 192 to the "enable" terminals of the counter 76 allowed the counters to resume a count. The next count in the series would be the setting of the sixth count stage (the second stage of the counter 78) constituting one enabling signal on the input of the gate 118. A second enabling signal for the gate 118 is applied from the "set" output of the fourth stage of the counter 76. That gate 118 is made on the occurrence of the next "clock" signal applied through the inverter 92. The output of the gate 118 is applied to one input terminal of the NOR gate 120, the output of which is applied through an inverter 122 to the "clear" input of the A-to-D cycle flip-flop 84, causing that flip-flop to reset. The resetting of the flip-flop 84 applies a "clear" signal to the control input of the filters 76 and 78 as well as to the flip-flop 150. That clearing of the counters resets all of the stages of the counter and resets the end-of-conversion flip-flop 150.

When the gate 130 is made, the gate 140 is disabled. The disabling of the gate 140 places a logical "low" at the input of the latch 98d which is then reset on the next "clock" signal. The resetting of the latch 98d first causes the switch 142 to be opened. The resetting of the latch 98d also applies a signal to the gate 140 causing a logical "low" to be applied to the input terminal of the latch 98c. The resetting of the latch 98c causes the switch assembly 138 to close the two switch elements therein, restoring the input short circuit to ground for the input leads 14.

Before the flip-flop 84 has been reset, and the latches and the counter and the end-of-conversion flip-flop 150 have all been cleared, the digitized conversion of the analog input signal is stored at the output terminals of the analog-to-digital converter module 128. At this point, the master controller 12 again addresses the analog-to-digital converter with a signal on the input lead 66 applied through the buffering inverters 88 and 86 to one input terminal of the gate 158. At this time, the mode selection code applied to the input lead 64 from the master controller 12 will be indicative of a "read" mode rather than a "write" mode. Accordingly, the flip-flop 84 will not be enabled. On the other hand, a "read" signal will be applied to the input terminal 74 of the gate 158 to allow that gate to be "made." The output of the gate 158 is applied as an enabling signal to each of the output terminals of the analog-to-digital converter. That signal from the gate 158 allows the digital equivalence of the input analog signal to be transmitted out of the converter circuits onto the output bus 22 thence into the master controller 12 by way of the bus 16.

In addition to the clearing of the analog-to-digital converter circuit as herein set forth, the circuit can be cleared either by the "master clear" signal applied to the input terminal 70 or the "abort" signal from the master controller applied to the input terminal 72. The "master clear" signal on the lead 70 is applied through the NOR gate 120 and the inverter 122 to the "clear" terminal and the cycle flip-flop 84 forcing a reset of that flip-flop with the results as set forth hereinbefore. The output of the inverter 122 is also applied through the NOR gate 124 to the "clear" terminal of the reset address flip-flop 100, resetting the address latches of the input multiplexer. The "abort" signal on the lead 72 is applied through the gate 154 to another input of the NOR gate 120 to reset the A-to-D cycle flip-flop 84 and the address flip-flop 100 as before. The "abort" signal is also applied to the input of the gate 156, thence directly to the "multiplex clear" input lead 64 of the multiplexer of FIG. 2.

Thus there has been provided in accordance with the present invention in an automatic process control instrumentation system an improved multiplexer, analog-to-digital converter circuit wherein selection may be made from a great many input circuits with the selected circuit being effectively isolated from the non-selected circuits and wherein the circuit is protected from spurious operation during a power up and a power down sequence.

The embodiments of the invention in which an exclusive property or privilege is claimed are defined as follows:

1. A digital computer based process control system including an analog input multiplexer control circuit and digital computer means for supplying digital control signals to said multiplexer control circuit, said multiplexer control circuit comprising:

a selectively controlled multiplexer module having a plurality of pairs of analog signal input terminals, a single pair of analog signal output terminals, and signal responsive input selection control terminals;

digital signal responsive logic control means for controlling the operation of said multiplexer module;

said logic control means including a latch assembly means for storing address signals received from said computer means and signal responsive gating means for controlling the operation of said latch assembly means; said gating means being responsive to further address and control signals from said computer means to provide control signals for said latch assembly means;

said latch assembly means also including latch means for storing a signal derived from said further address and control signals to provide a controlled "enable" signal for said multiplexer module;

signal responsive solid state switch means connected serially to said output terminals of said multiplexer module; and means connecting the output of said last mentioned latch means of said latch assembly means to said solid state switch means to control the operation thereof.

2. A digital computer based process control system including an analog input multiplexer control circuit and digital computer means for supplying digital control signals to said multiplexer control circuit, said multiplexer control circuit comprising:

a selectively controlled multiplexer module having a plurality of pairs of analog signal input terminals, a single pair of analog signal output terminals, and signal responsive input selection control terminals;

digital signal responsive logic control means for controlling the operation of said multiplexer module;

said logic control means including a latch assembly means for storing address signals received from said computer means and signal responsive gating means for controlling the operation of said latch assembly means; said gating means being responsive to further address and control signals from said computer means to provide control signals for said latch assembly means;

said latch assembly means having output means for said stored address signals and means connecting said input selection control terminals of said multiplexer module to said latch assembly output means;

said latch assembly means also including latch means for storing a signal derived from said further address and control signals to provide a controlled "enable" signal for said multiplexer module;

signal responsive solid state switch means connected serially to said output terminals of said multiplexer module; and means connecting the output of said last mentioned latch means of said latch assembly means to said solid state switch means to control the operation thereof.

3. A digital computer based process control system including an analog input multiplexer control circuit and digital computer means for supplying digital control signals to said multiplexer control circuit, said multiplexer control circuit comprising:

a selectively controlled multiplexer module having a plurality of pairs of analog signal input terminals, a single pair of analog signal output terminals, and signal responsive input selection control terminals;

digital signal responsive logic control means for controlling the operation of said multiplexer module;

said logic control means including a latch assembly means for storing address signals received from said computer means and signal responsive gating means for controlling the operation of said latch assembly means; said gating means being responsive to further address and control signals from said computer means to provide control signals for said latch assembly means;

said latch assembly means having output means for said stored address signals and means connecting said output means to said input selection control terminals of said multiplexer module;

said latch assembly means also including latch means for storing a signal derived from said further address and control signals to provide a controlled "enable" signal for said multiplexer module.

4. A digital computer based process control system including an analog input multiplexer control circuit and digital computer means for supplying digital control signals to said multiplexer control circuit, said multiplexer control circuit comprising:

a selectively controlled multiplexer module having a plurality of pairs of analog signal input terminals, a single pair of analog signal output terminals, and signal responsive input selection control terminals;

digital signal responsive logic control means for controlling the operation of said multiplexer module;

said logic control means including a latch assembly means for storing address signals received from said computer means and signal responsive gating means for controlling the operation of said latch assembly means; said gating means being responsive to further address and control signals from said computer means to provide control signals for said latch assembly means;

said latch assembly means having output means for said stored address signals and means connecting said output means to said input selection control terminals of said multiplexer module;

said latch assembly means also including further latch means for storing a signal derived from said further address and control signals to provide a controlled "enable" signal for said multiplexer module; and output circuit means including further gating means connecting an output for said stored further address and control signal to an "enable" input terminal on said multiplexer module.

5. A multiplexer control circuit as set forth in claim 4 wherein said further gating means is enabled by an external signal from said computer means.

6. A digital computer based process control system including an analog input multiplexer control circuit and digital computer means for supplying digital control signals to said multiplexer control circuit, said multiplexer control circuit comprising:

a selectively controlled multiplexer module having a plurality of pairs of analog signal input terminals, a single pair of analog signal output terminals, and signal responsive input selection control terminals;

digital signal responsive logic control means for controlling the operation of said multiplexer module;

said logic control means including a latch assembly means for storing address signals received from said computer means and signal responsive gating means for controlling the operation of said latch assembly means; said gating means being responsive to further address and control signals from said computer means to provide control signals for said latch assembly means;

said latch assembly means having output means for said stored address signals and means connecting said output means to said input selection control terminals of said multiplexer module;

said latch assembly means also including further latch means for storing a signal derived from said further address and control signals to provide a controlled "enable" signal for said multiplexer module, output circuit means including further gating means connecting an output for said stored further address and control signals to an "enable" input terminal on said multiplexer module;

signal responsive solid state switch means connected serially to said output terminals of said multiplexer module; and means connecting the output of said last mentioned latch means of said latch assembly means to said solid state switch means to control the operation thereof.

* * * * *